(12) United States Patent
Garera et al.

(10) Patent No.: US 10,127,603 B2
(45) Date of Patent: Nov. 13, 2018

(54) OPTIMIZING PRODUCT FEATURES WITH RESPECT TO PRICE

(71) Applicant: Wal-Mart Stores, Inc., Bentonville, AR (US)

(72) Inventors: Nikesh Garera, Bangalore (IN); Abhishek Shrivastava, Bhilai (IN); Deeksha Sood, Bangalore (IN); Nikhil Simha, Hyderabad (IN)

(73) Assignee: WALMART APOLLO, LLC, Bentonville, AR (US)

( * ) Notice: Subject to any disclaimer, the term of this patent is extended or adjusted under 35 U.S.C. 154(b) by 1000 days.

(21) Appl. No.: 14/081,492

(22) Filed: Nov. 15, 2013

(65) Prior Publication Data

US 2015/0142599 A1    May 21, 2015

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0641* (2013.01); *G06Q 30/0283* (2013.01); *G06Q 30/0627* (2013.01); *G06Q 30/0643* (2013.01)

(58) Field of Classification Search
CPC .......... G06Q 30/0641; G06Q 30/0643; G06Q 30/0283; G06Q 30/0627
See application file for complete search history.

(56) References Cited

U.S. PATENT DOCUMENTS

| | | |
|---|---|---|
| 6,976,006 B1 | 12/2005 | Verma et al. |
| 7,107,226 B1 | 9/2006 | Cassidy et al. |
| 7,302,429 B1 | 11/2007 | Wanker |
| 7,698,279 B2 * | 4/2010 | Musgrove ............ G06Q 10/087 707/999.01 |
| 7,890,378 B2 | 2/2011 | Clarke et al. |
| 7,996,282 B1 * | 8/2011 | Scott ..................... G06Q 30/06 705/27.1 |
| 8,255,291 B1 | 8/2012 | Nair |
| 2012/0191577 A1 | 7/2012 | Gonsalves et al. |

\* cited by examiner

*Primary Examiner* — William J Allen
*Assistant Examiner* — Anand R Loharikar
(74) *Attorney, Agent, or Firm* — Bryan Cave Leighton Paisner LLP

(57) ABSTRACT

Some embodiments include a method of facilitating item selection based on features. Other embodiments of related systems and methods are also disclosed.

20 Claims, 8 Drawing Sheets

OPTIMIZING PRODUCT FEATURES WITH RESPECT TO PRICE

TECHNICAL FIELD

This disclosure relates generally to online retail of consumer merchandise, and relates more particularly to facilitating online item selection.

BACKGROUND

Modern consumers have a many choices when selecting products to purchase. When shopping for a type of item, consumers often have a general idea of how much money they are willing to spend, and want to know which features are and are not available on items at the desired price. Consumers sometimes have some leeway in their budgeted price, and would like to know which additional features are available given a specific increase in price. Moreover, consumers often want to know which other features are and are not included with items having a particular feature.

BRIEF DESCRIPTION OF THE DRAWINGS

To facilitate further description of the embodiments, the following drawings are provided in which.

Figure 1:
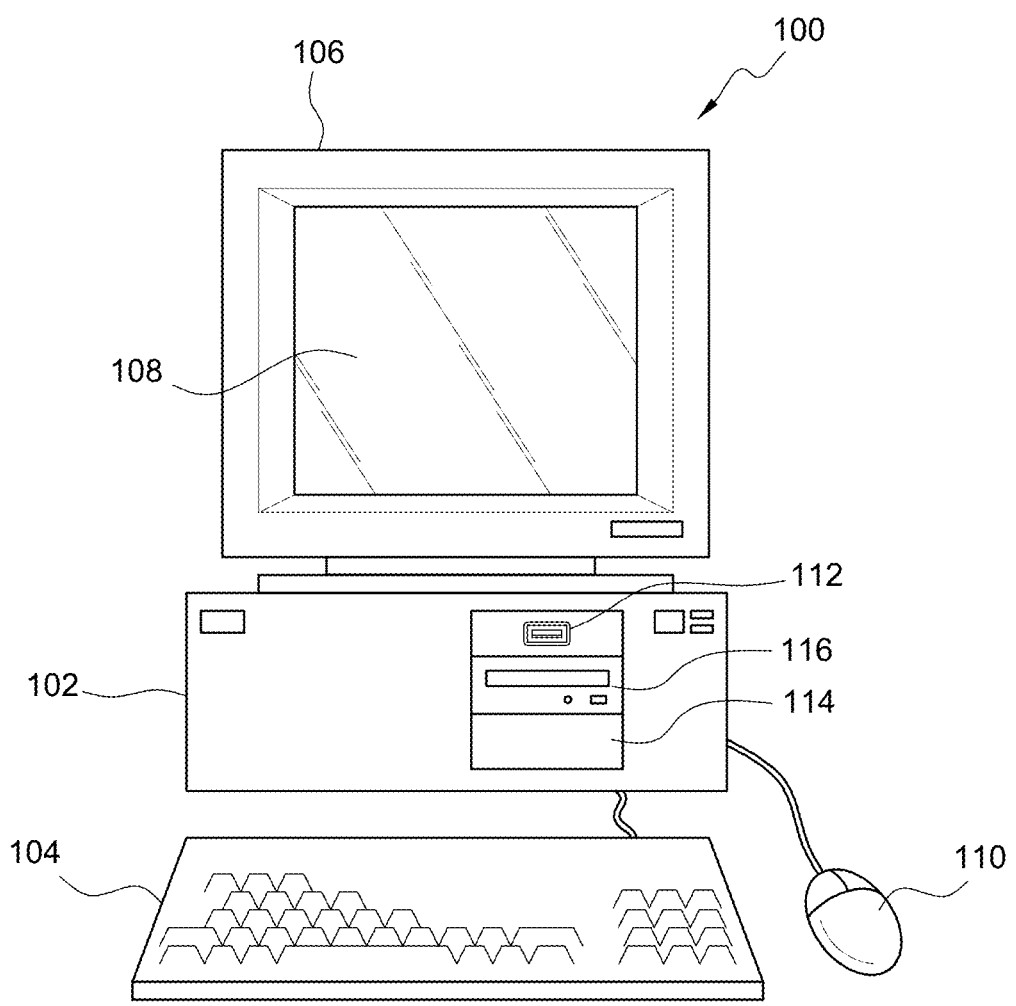
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a method of facilitating item selection based on features. The features can be an aggregate of item features corresponding to all items in a category of items. The method can be implemented via execution of computer instructions configured to run at one or more processing modules and configured to be stored at one or more non-transitory memory storage modules. The method can include receiving a category selection for the category of items. The method also can include receiving a first price selection. Additionally, the method can include determining a first subset of items from the category of items having a price less than or equal to the first price selection. The method also can include determining, for each of the features, a feature categorization. The feature can be categorized in a first category if the feature corresponds to at least one of the item features of at least one item of the first subset of items. Otherwise, the feature can be categorized in a second category. The method also can include displaying, for each of the features, a feature identifier and a status indicator. The status indicator can be based at least in part on the feature categorization.

Further embodiments can include a system for identifying one or more desirable items in a category of items. The system can include one or more processing modules and one or more non-transitory memory storage modules storing computing instructions configured to run on the one or more processing modules. The computing instructions can perform receiving a category selection for the category of items. The computing instructions also can perform receiving a first price selection. Additionally, the computing instructions can perform determining a first subset of items from the category of items having a price less than or equal to the first price selection. The computing instructions also can perform determining, for each of the features, a feature categorization. The feature can be categorized in a first category if the feature corresponds to at least one of the item features of at least one item of the first subset of items. Otherwise, the feature can be categorized in a second category. The computing instructions also can perform displaying, for each of the features, a feature identifier and a status indicator. The status indicator can be based at least in part on the feature categorization.

Figure 2:
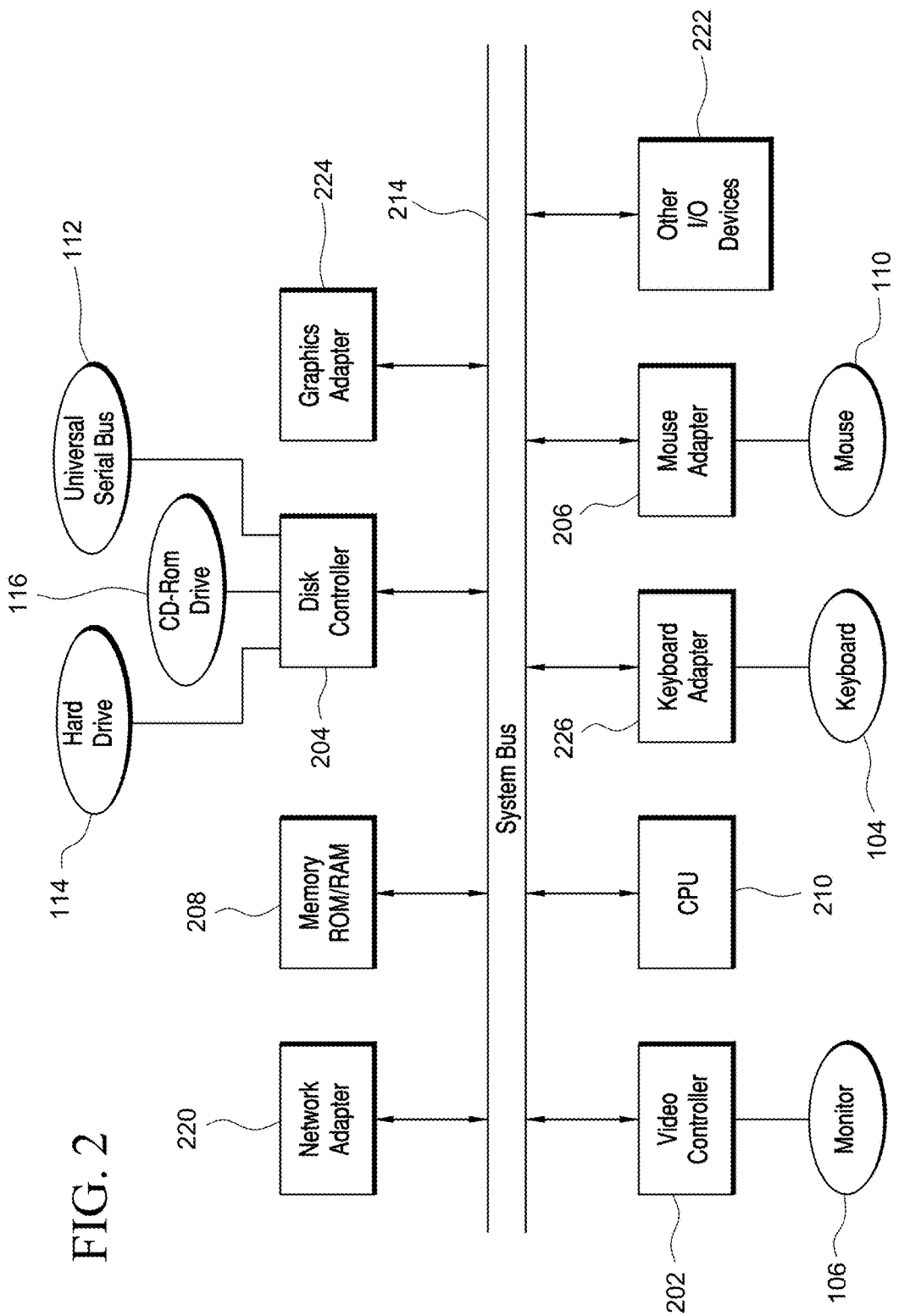
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described below. As an example, a different or separate one of a chassis 102 (and its internal components) can be suitable for implementing the techniques described below. Furthermore, one or more elements of computer system 100 (e.g., a refreshing monitor 106, a keyboard 104, and/or a mouse 110, etc.) can also be appropriate for implementing the techniques described below. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described below.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
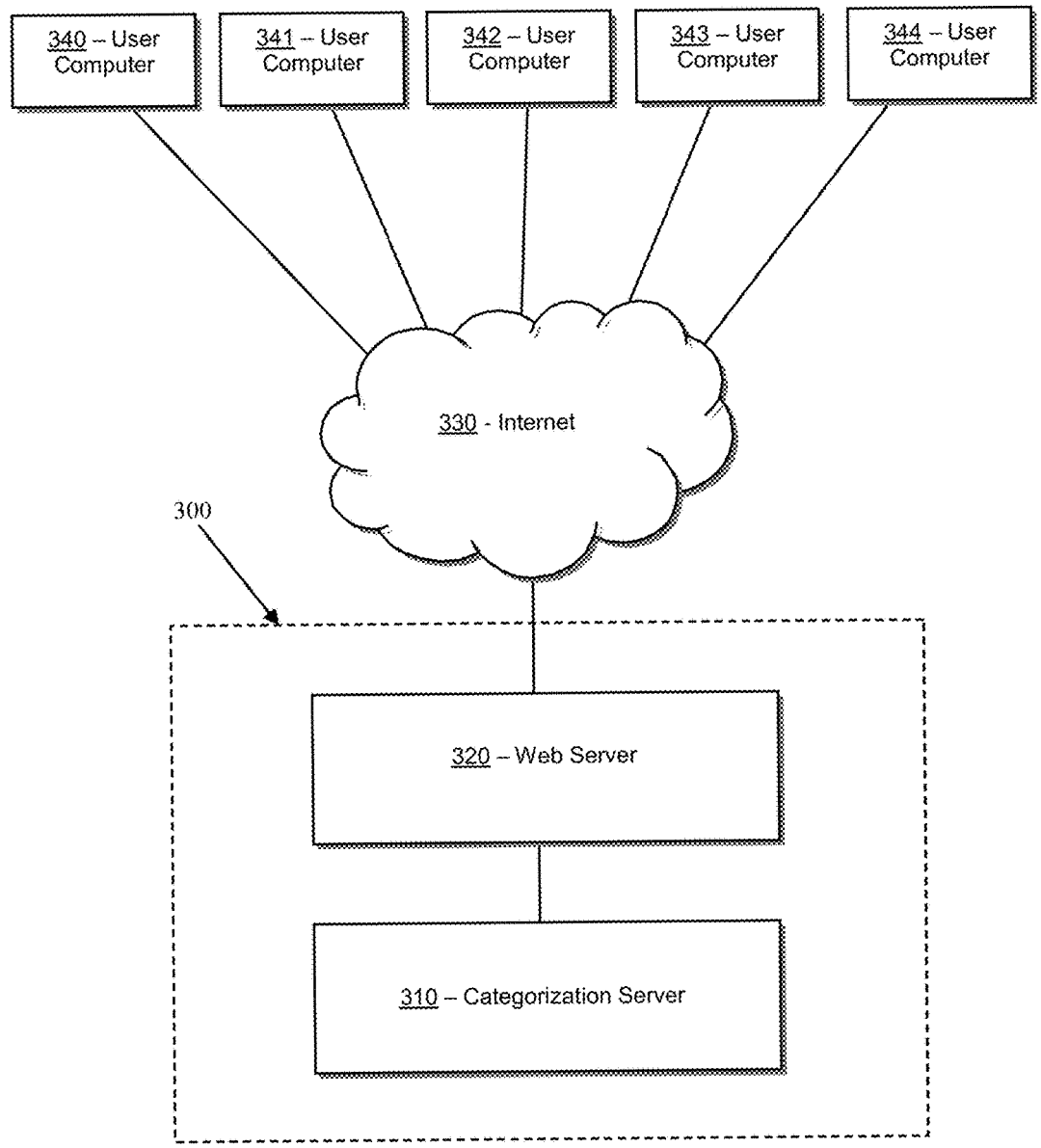
FIG. 3 illustrates a block diagram of an example of a system for facilitating item selection, according to an embodiment.

Turning ahead in the drawings, FIG. 3 illustrates a block diagram of a system 300 that can be employed for facilitating item selection, according to an embodiment. System 300 is merely exemplary and embodiments of the system are not limited to the embodiments presented herein. The system can be employed in many different embodiments or examples not specifically depicted or described herein. In some embodiments, certain elements or modules of system 300 can perform various procedures, processes, and/or activities. In other embodiments, the procedures, processes, and/or activities can be performed by other suitable elements or modules of system 300. In some embodiments, system 300 can include a categorization server 310 and/or a web server 320. Web server 320 and/or categorization server 310 can be each be a computer system, such as computer system 100 (FIG. 1), as described above, and can each be a single computer, a single server, or a cluster or collection of computers or servers, or a cloud of computers or servers. Additional details regarding categorization server 310 and web server 320 are described below.

In some embodiments, web server 320 can be in data communication through Internet 330 with user computers (e.g., 340, 341, 342, 342, 344). In certain embodiments, user computers 340-344 can be desktop computers, laptop computers, smart phones, tablet devices, and/or other endpoint devices. Web server 320 can host one or more websites. For example, web server 320 can host an eCommerce web site that allows users to browse and/or search for items, to add items to an electronic shopping cart, and/or to purchase items, in addition to other suitable activities. In various embodiments, each item sold thorough the website can be categorized in one or more categories. Accordingly, each category can include a group of items. In a number of embodiments, web server 320 can allow a user to browse items sold through the website by category. In many embodiments, a user can select the category from a list of categories, or can search on the category by search terms related to the category or items in the category. For example, a user can search for cell phones and can browse through all the cell phones that can be purchased through the web site.

In several embodiments, each item sold through the website can have a number of item features. The item features can be attributes of the item. For example, the item features can be the attributes and/or specifications of the item that were added as part of the product information at the time the item was added to the online database of products to the sold by the website. As a non-limiting example, a certain model of cell phone can be added to the online database under the category of "cell phones," and attributes and specifications of the cell phone model can be added as item features. For example, the cell phone model can include attributes such as touchscreen, full keyboard, SMS, Email, Instant Messaging, digital camera, GPS receiver, GLONASS receiver, digital TV tuner, voice recorder, digital player, Wi-Fi hotspot, MicroUSB connector, headphone jack, MicroSD slot, and so forth. Each of these attributes can be added as an item feature for that particular cell phone model. Other models of cell phones can have the same and/or additional item features. In some embodiments, all of the attributes and specifications of an item can be added as item features for the item. In some embodiments, each item and its associated item features are stored in a database, such as a database stored in categorization server 310.

In certain embodiments, two or more item features can be categorized as part of the same feature type. For example, item features such as digital camera, FM radio, GLONASS receiver, GPS receiver, Wi-Fi hotpot can all be part of an "Integrated Components" feature type. As another example, item features such as Flash, HTML 5.0, and Java can all be part of a "Technology Supported" feature type. Each feature type and its associated features can be stored in the database.

Figure 4:
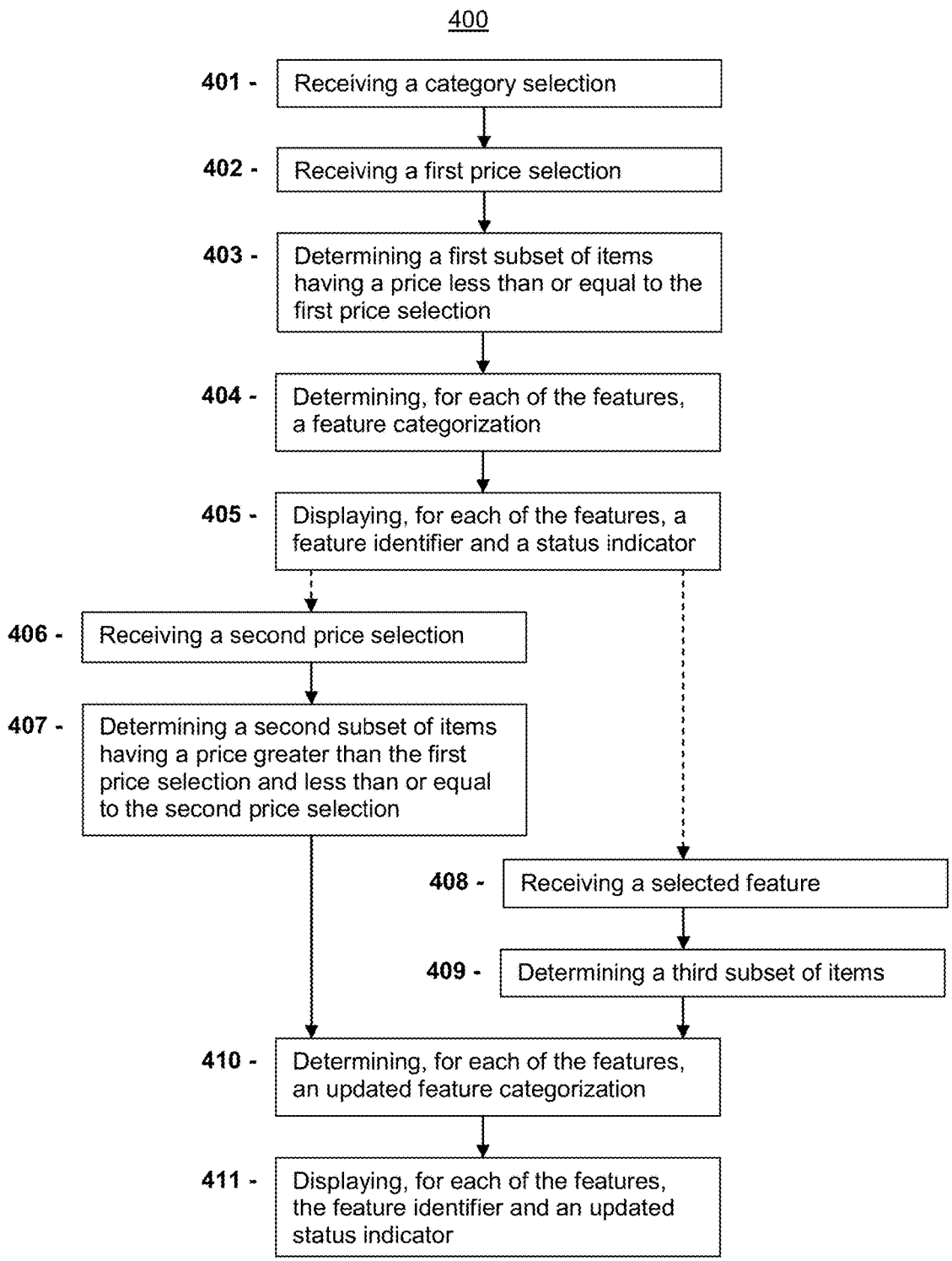
FIG. 4 illustrates a flow chart for an exemplary procedure of facilitating item selection, according to another embodiment.

Turning ahead in the drawings, FIG. 4 illustrates a flow chart for a method 400 of facilitating item selection based on features, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In some embodiments, method 400 can be implemented by categorization server 310 (FIG. 3) and/or web server 320 (FIG. 3).

In many embodiments, the features can be an aggregate of item features corresponding to all items in the category of items. Although in some embodiments there can be thousands or even millions of items in the entire online database, with each item having several item features, a particular category can have a lesser number of items. As a simple example for purposes of illustration, a category can include three items, and the first item in a particular category can have features $F_1$, $F_2$, and $F_3$; the second item in the category can have features $F_1$, $F_3$, $F_4$, and $F_5$; and the third item in the category can have features, $F_1$, $F_2$, $F_5$, and $F_6$, where $F_x$ represents a different feature for each value of x. In this example, some of the items have overlapping item features. Specifically, for example, item feature $F_1$ is an item feature for each of the items, and item feature $F_2$ is an item feature for the first and third items. The features in the category would be each of the item features corresponding to the items in the category, which in this example would be $F_1$, $F_2$, $F_3$, $F_4$, $F_5$, and $F_6$. The features in the category can be a subset of all the item features corresponding to all the items in the entire catalog.

Referring to FIG. 4, in some embodiments method 400 can include block 401 of receiving a category selection for the category of items. In many embodiments, a user can select a category through a web page on one of the user computers (e.g., 340-344), such as by selecting the category from a list of categories, or by searching for the category using search terms. Web server 320 (FIG. 3) can then receive the category selection.

In a number of embodiments, method 400 can include block 402 of receiving a first price selection. In some embodiments, a user can select the first price through a web page on one of the user computers (e.g., 340-344 in FIG. 3). For example, the web page can present a slider, which can allow the user to move the slider between the lowest price of any item in the category and the highest price of any item in the category. In other examples, the web page can allow the user to type in a first price selection. Web server 320 (FIG. 3) can then receive the first price selection.

In many embodiments, method 400 can include block 403 of determining a first subset of items from the category of items. Each item in the first subset of items can have a price less than or equal to the first price selection. For example, if the user selected "phones" as the category and a first price of $60, then the first subset of items would include phones priced at $60 or less. In some embodiments, categorization server 310 (FIG. 3) can determine which items are in the first subset of items. In a number of embodiments, categorization server 310 (FIG. 3) can predetermine, for each possible first price selection, the first subset of items having a price less than or equal to the possible first price selection. For example, if the highest-priced phone in the category of items is $830 and the lowest priced phone is $30, categorization server 310 (FIG. 3) can predetermine the first subset of items for each whole-dollar price between $30 and $830, such as $30, $31, $32, $33, up to $830. In other examples, categorization can predetermine the first subset of items for each price differentiated by cent between $30 and $830, such as $30.00, $30.01, $30.02, $30.03, up to $830.00. By performing preprocessing to predetermine the first subset of items, categorization server 310 (FIG. 3) and/or web server 320 (FIG. 3) can more quickly provide information related to the first subset of items after a user selects a first price selection.

In various embodiments, method 400 can include block 404 of determining, for each of the features, a feature categorization. In many embodiments, the feature categorization can include a first category and a second category (or one or more second categories). Each feature can be categorized into either the first category or the second category. The feature can be categorized into the first category if the feature corresponds to at least one item feature of at least one item of the first subset of items. Otherwise, the feature can be categorized into the second category. For example, each feature that is available on any items in the category having a price less than or equal to the first price selection can be categorized in the first category, and each feature that is not available on any item in the category having a price less than or equal to the first price selection can be categorized in the second category. In some embodiments, categorization server 310 (FIG. 3) can determine the feature categorization. In a number of embodiments, categorization server 310 (FIG. 3) can predetermine, for each of the features at each possible first price selection, the feature categorization. For example, if the highest-priced phone in the category of items is $830 and the lowest priced phone is $30, categorization server 310 (FIG. 3) can predetermine, at each whole-dollar price between $30 and $830, the feature categorization of each feature, such that the feature is categorized in the first category if the feature corresponds to at least one of the item features of at least one item of the first subset of items, or otherwise is categorized into the second category. By performing preprocessing to predetermine the feature categorization, categorization server 310 (FIG. 3) and/or web server 320 (FIG. 3) can more quickly provide information related to the feature categorization after a user selects a first price selection.

Figure 5:
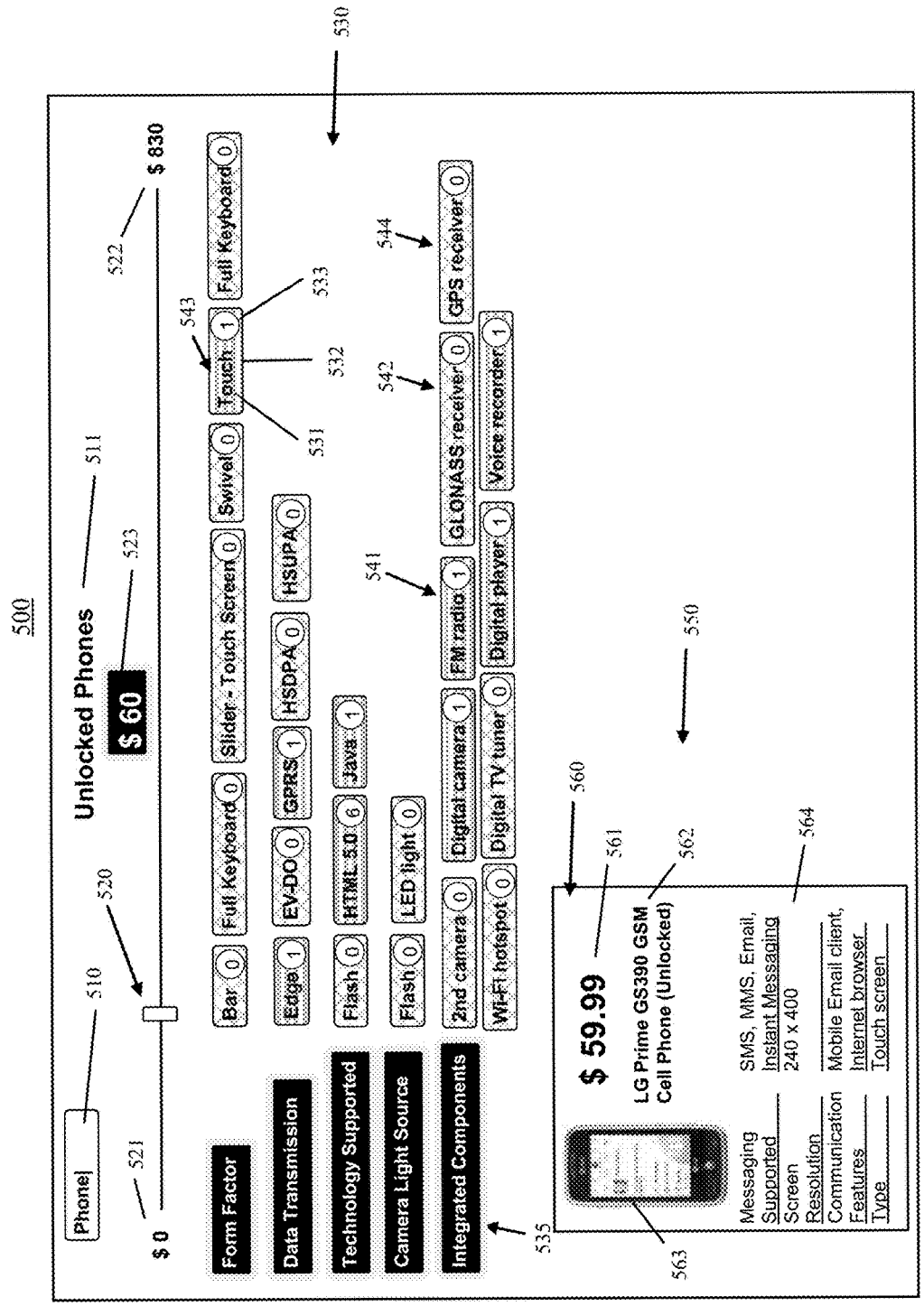
FIG. 5 illustrates an example web page for facilitating item selection based on a first price selection, according to an embodiment disclosed in FIG. 4.
Figure 6:
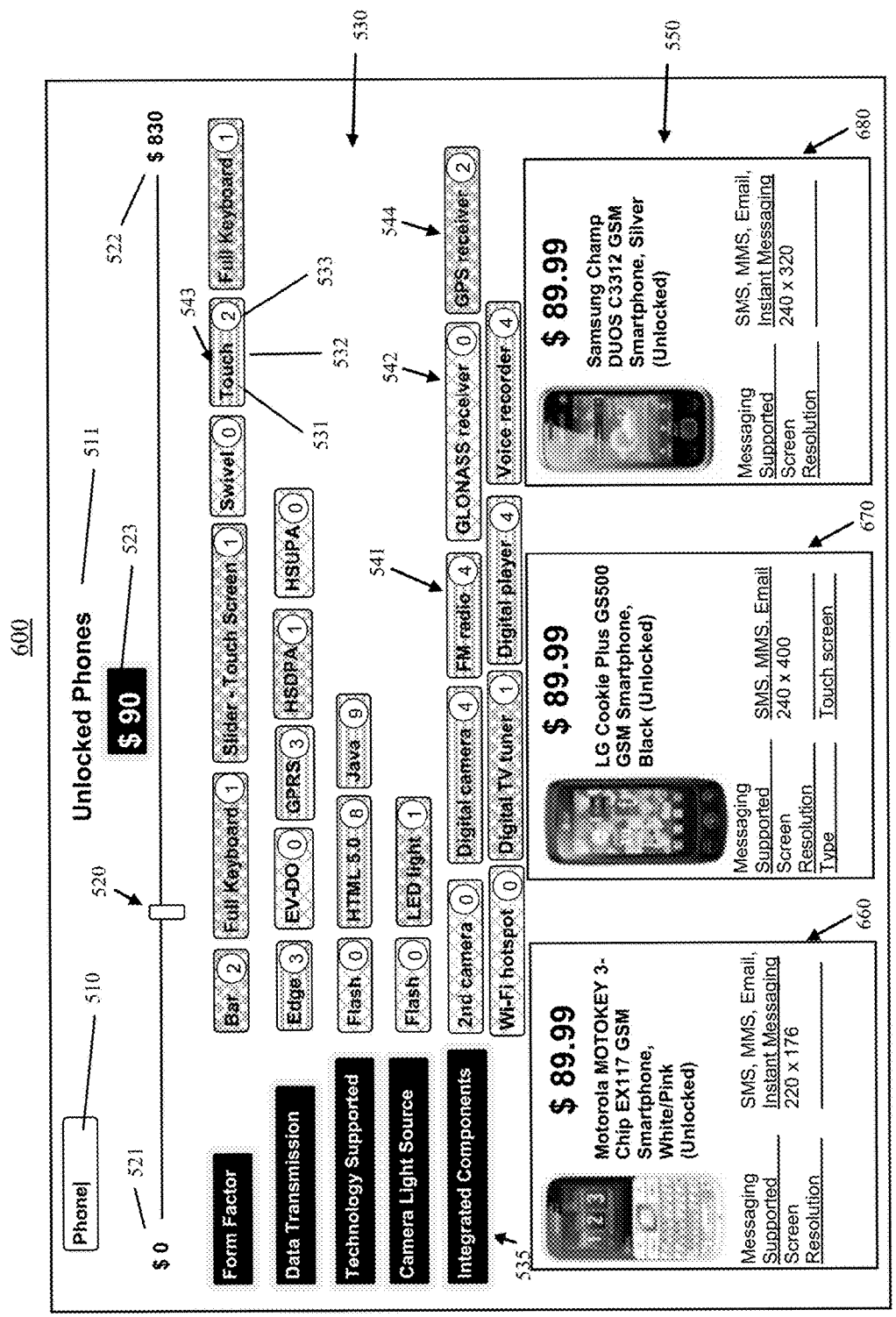
FIG. 6 illustrates an example web page for facilitating item selection based on a first and second price selection, according to an embodiment disclosed in FIG. 4.
Figure 7:
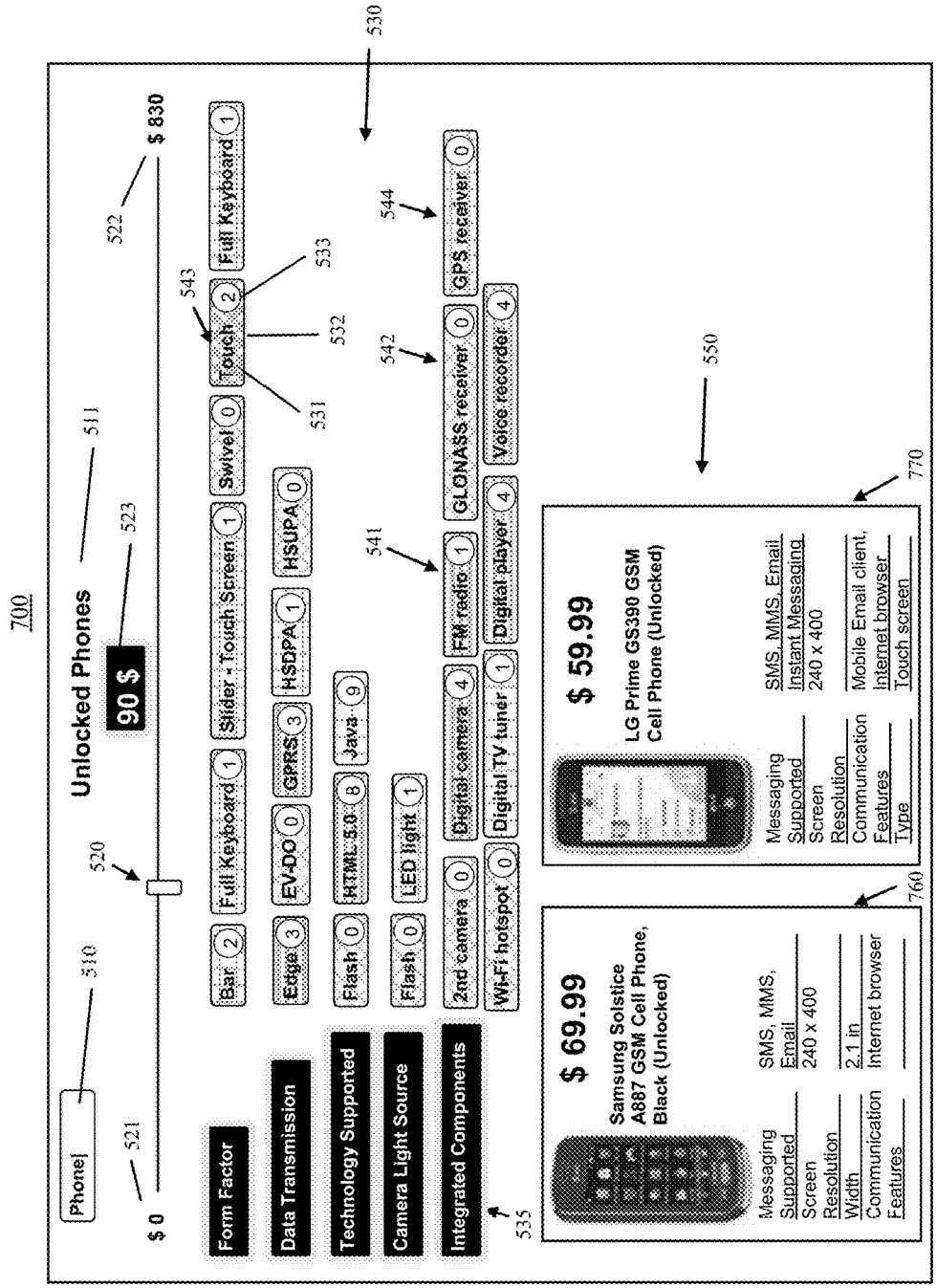
FIG. 7 illustrates an example web page for facilitating item selection based on features associated with a selected feature, according to an embodiment disclosed in FIG. 4.

In some embodiments, method 400 can include block 405 of displaying, for each of the features, a feature identifier and a status identifier. For example, the feature identifier and the status identifier for each feature can be displayed by web server 320 (FIG. 3) to a user in a feature listing on a web page, as shown in FIGS. 5-7, described below. The feature identifier can be a name, description, and/or a depiction of the feature, or another suitable identifier. In certain embodiments, the status indicator can be based at least in part on the feature categorization determined in block 404. In many embodiments, the status indicator for each of the features can include a distinctive indicator, such as a color, a pattern, and/or another suitable indicator. For example, the status indicator for each feature can be a different color based on the categorization of the feature, as determined by the feature categorization in block 404. In certain embodiments, the status indicator is a first color if the feature is categorized in the first category of the feature categorization determined in block 404, or a second color if the feature is categorized in the second category of the feature categorization determined in block 404, as shown in FIG. 5, described below. The status indicator can advantageously enable a user to readily recognize features that are included on any items in the category that are available at or below the first price selection, as well as which features are not available at or below the first price selection.

In a number of embodiments, the status indicator for each of the features can include a quantity indicator based on a quantity of items from the first subset of items that have item features corresponding to the feature. For example, if ten items are available at a first price selection, and a certain feature is available on three of the ten items available at the first price selection, then the quantity indicator for the feature can display a numeral "3" to represent the three items available at the first price selection that have item features corresponding to the feature. In various embodiments in which multiple features are part of a feature type, the feature identifiers and the status indicators can be displayed for each feature by feature type, as shown in FIGS. 5-7, described below.

In many embodiments, the features can be displayed in the feature listing by an ordering of the features. The order of the features can be based on relevance of the features. In some embodiments, the features can be fully or partially ordered by the quantity of items in the category having item features corresponding to the feature. For example, features present in a greater number of items in the category can be listed earlier in the feature listing. Alternatively, or in addition to, the features can be fully or partially ordered by sales volumes of items having item features corresponding to the feature. For example, features present on high-selling items can be listed earlier in the feature listing. Alternatively, or in addition to, the features can be fully or partially ordered by an inherent ranking of the features. For example, a numeric order of memory sizes is an inherent ranking of features related to memory sizes, and memory-size features can be listed in a numeric order, such as 8 GB, 16 GB, 32 GB, 64 GB, etc. In various embodiments in which multiple features are of the same feature type, the features can be ordered within the feature type, e.g., by an inherent ranking of the features, by sales volumes of items having the features, and/or by a quantity of items having the features.

In certain embodiments, only a subset of all the features is displayed. In some embodiments, the number of features in the subset can be a predefined feature display limit. The predefined feature display limit can have a different or the same value for each category. In a number of embodiments, the user can define and/or change the feature display limit. In many embodiments, the subset of features can include features having a highest order in the ordering of the features, such that the number of features displayed is less than the feature display limit. For example, a user can choose to view the fifty most relevant features, according to the ordering of the features described above.

In a number of embodiments, certain item features can be included with every item in the category of items or with every item in every category. For example, a "shipping weight" feature may be included with every item in every category, or a "phone connectivity" feature may be included with every item in a category of phones. In some embodiments, the features included for the feature categorization of block 404 and/or the features included in the display of the feature identifiers and status indicators in block 405 can be devoid of features that correspond to item features that are included with every item in the category of items and/or that are included with every item in every category.

In various embodiments, method 400 can include (as part of or separate from block 405) displaying each item of the first subset of items. For example, the items can be displayed by web server 320 (FIG. 3) to a user in an item listing on a web page, as shown in FIGS. 5-7, described below. In many embodiments, displaying each item of the first subset of items can include displaying, for each item, an item identifier, an item depiction, an item price, and/or a list of item features corresponding to the item. The item identifier can be a product name for the item. By displaying each item of the first subset of items, web server 320 (FIG. 3) can advantageously provide to the user with information regarding the items that have a price less than or equal to the first price selection. In many embodiments, the item listing and the feature listing can be displayed together on the same web page.

In some embodiments, method 400 can include block 406 of receiving a second price selection greater than the first price selection received in block 402. In some embodiments block 406 can occur after block 402 of receiving the first price selection, and can occur before or after blocks 403-405. In certain embodiments, a user can select the second price through a web page on one of the user computers (e.g., 340-344). For example, the web page can present a second slider, which can allow the user to move the slider between the first price selection and the highest price of any item in the category. In other examples, the web page can allow the user to select the second price by moving the first slider to a price higher than the first price selection. In other examples, the web page can allow the user to type in a second price selection. Web server 320 (FIG. 3) can then receive the second price selection.

In many embodiments, method 400 can include block 407 of determining a second subset of items from the category of items. Each item in the second subset of items can have a price greater than the first price selection and less than or equal to the second price selection. For example, if the user selected "phones" as the category, and selected a first price of $60 and a second price of $90, then the second subset of items would include phones priced greater than $60, but at or less than $90. In some embodiments, categorization server 310 (FIG. 3) can determine which items are in the second subset of items. As described above, categorization server 310 (FIG. 3) can predetermine the first subset of items for each possible first price selection. In a number of embodiments, categorization server 310 (FIG. 3) can determine the second subset of items by determining a difference in items between the predetermined first subset of items for the first price selection and the predetermined first subset of items for the second price selection. For example, categorization server 310 (FIG. 3) can determine the difference in items between the predetermined first subset of items for a price selection of $60 and the predetermined first subset of items for a price selection of $90, thus yielding the items in the second subset of items for a first price selection of $60 and a second price selection of $90.

In various embodiments, method 400 can include block 408 of receiving a selected feature from a features categorized in the first category. In some embodiments block 408 can occur after block 405 of displaying each of the feature identifiers and status indicators, and can occur instead of or simultaneously with blocks 406 and/or 407. In certain embodiments, a user can select a feature from the features categorized in the first category through a web page on one of the user computers (e.g., 340-344). For example, as described above, the web page can display the feature listing, and can display the status indicator for each feature, indicating whether or not the feature is available at the first price selection. The user can select a feature that is available at the first price selection, such as by clicking on the feature identifier and/or status indicator. Web server 320 (FIG. 3) can then receive the selected feature.

In a number of embodiments, method 400 can include block 409 of determining a third subset of items from the category of items. Each item in the third subset of items can be included in the first subset of items and can have item features corresponding to the selected feature, which was received in block 408. For example, if the user selected "phones" as the category and selected a first price of $60, then the feature listing displayed in block 405 can include the first category of features (included on items within the first price selection) and the second category of features (not included on any items within the first price selection). The user can select a feature in the first category of features, and categorization server 310 (FIG. 3) can determine the third subset of items from items included in the first subset of items (having a price less than or equal to $60) that also have the selected feature.

In many embodiments, method 400 can include block 410 of determining, for each of the features, an updated feature categorization. In some embodiments, block 410 can occur after block 407 and/or block 409. In some embodiments, determining the updated feature categorization can include modifying the feature categorization determined in block 404.

In certain embodiments, such as after determining the second subset of items in block 407, a feature categorized in the second category can be categorized in a third category if the feature corresponds to at least one of the item features of at least one item of the second subset of items. Otherwise, the feature can remain in the same category. In some embodiments, categorization server 310 (FIG. 3) can determine the updated feature categorization. As described above, categorization server 310 (FIG. 3) can predetermine the feature categorization for each of the features at each possible price selection. In a number of embodiments, categorization server 310 (FIG. 3) can determine the updated feature categorization by determining a difference in features between the predetermined feature categorization for the first price selection and the predetermined feature categorization for the second price selection. For example, the features categorized in the first category of the feature categorization for the second price selection, but not categorized in the first category of the feature categorization for the first price selection, can be categorized in the third category in the updated feature categorization.

In certain other embodiments, such as after determining the third subset of items in block 409, the selected feature is categorized in the third category. Each of the other features that correspond to at least one of the item features of at least one item of the first subset of items, but do not correspond to at least one of the item features of at least one item of the third subset of items, can be categorized into a fourth category. Otherwise, the feature can remain in the same category.

In some embodiments, method 400 can include block 411 of displaying, for each of the features, the feature identifier and an updated status indicator. For example, the feature listing displayed by web server 320 (FIG. 3) to the user can be updated with the updated status indicator, as shown in FIGS. 6-7, described below. In certain embodiments, block 411 can occur after block 410. The updated status indicator can be based, at least in part, on the updated feature categorization determined in step 410. The updated status indicator for each of the features can include a distinctive indicator, such as a color, a pattern, and/or another suitable indicator. Displaying the updated status indicator for each feature can be similar to displaying the status indicator, as described above, and one or more of the procedures, the processes, and/or the activities used in displaying the status indicator can be used in displaying the updated status indicator.

In certain embodiments, such as after determining the second subset of items in block 407 and determining the updated feature categorization in block 410, the color of the updated status indicator can be a first color if the feature is categorized in the first category of the updated feature categorization. The updated status indicator can be a second color different from the first color if the feature is categorized in the second category of the updated feature categorization. The updated status indicator can be a third color different from the first and second colors if the feature is categorized in the third category of the updated feature categorization. The updated status indicator for each of the features can include a quantity indicator based on the quantity of items from the first and second subset of items that have item features corresponding to the feature. For example, if ten items are available at the second price selection, and a certain feature is available on six of the ten items available at the second price selection, then the quantity indicator for the feature can display a number "6" to represent the six items available at the second price selection and having item features corresponding to the feature. The updated status indicator can advantageously enable a user to readily recognize features that are included on items in the category at a first price, as well as additional features that are included on items in the category at a higher second price. The updated status indicator can also enable a user to readily recognize features that are not included on any items in the category even at the higher second price. The updated feature listing can thus advantageously facilitate item selection by providing an intuitive, cogent visual display of which features are available at a certain price and at a given increase in price. The feature listing can allow a user to optimize the features available on items within a given budget and within a given increase in the budget.

In certain other embodiments, such as after determining the third subset of items in block 409 and after determining the updated feature categorization in block 410, the color of the updated status indicator can be a first color if the feature is categorized in the first category of the updated feature categorization. The updated status indicator can be a second color different from the first color if the feature is categorized in the second category of the updated feature categorization. The updated status indicator can be a third color different from the first and second colors if the feature is categorized in the third category of the updated feature categorization. The updated status indicator can be a fourth color different than the first, second, or third colors if the feature is categorized in the fourth category. The updated status indicator for each of the features can include a quantity indicator based on the quantity of items from the first subset of items that have item features corresponding to the feature. The updated status indicator can advantageously enable a user to readily recognize other features that are and are not included with a selected feature on items in the category at a first price, as well as features that are not included on any items in the category at the first price. The updated feature listing can thus advantageously facilitate item selection by providing a cogent and intuitive visual display of which features are available with another feature at a certain price.

In various embodiments, method 400 can include (as part of or separate from block 411) displaying each item of the second subset of items and/or displaying each item of the third subset of items. As described above, the items can be displayed by web server 320 (FIG. 3) to a user in an item listing on a web page, as shown in FIGS. 5-7, described below. In some embodiments, displaying each item of the second or third subset of items can include displaying, for each item, an item identifier, an item depiction, an item price, and/or a list of item features corresponding to the item. By displaying each item of the second subset of items, web server 320 (FIG. 3) can advantageously provide the user with information regarding the additional items that are available at a second price higher than the first price. By displaying each item of the third subset of items, web server 320 (FIG. 3) can advantageously provide the user with information regarding items having item features corresponding to the selected feature. In many embodiments, as explained above, the item listing and the feature listing can be displayed together on the same web page.

Turning ahead in the drawings, FIG. 5 illustrates an example web page 500 for facilitating item selection based on a first price selection, in accordance with embodiments described herein. Web page 500 is merely exemplary, and embodiments for facilitating item selection can be employed in many different embodiments or examples not specifically depicted or described herein. In some embodiments, web server 320 (FIG. 3) can provide web page 500 to user computers (e.g., 340-344 (FIG. 3)), which can allow a user to select a category of products. For example, web page 500 can include a category selection field 510. Category selection field 510 can allow a user to type in a category or to select a category from a drop-down list. For example, in some embodiments a user can type in "Phone" and select "Unlocked Phones." Category selection field 510 can be used for block 401 (FIG. 4) of receiving a category selection. Upon selection of a category, the name of the category can be displayed in a selected category field 511.

In certain embodiments, web page 500 can include a slider 520, and can allow a user to move slider 520 between a lower price 521 and an upper price 522 to select a first price. In many embodiments, as the user moves slider 520, the first price selection can be continuously updated in a price selection field 523. Slider 520 can be used for block 402 (FIG. 4) of receiving a first price selection.

In a number of embodiments, web page 500 can include a feature listing 530, for example, as provided by block 405 (FIG. 4). For example, feature listing 530 can include features 541-544. The feature listing can include many more features than the features shown in FIG. 5, and the features shown are merely for purposes of illustration. Web page 500 can display, for each feature, a feature identifier, such as a name of the feature. As shown in FIG. 5, the display of each feature, such as feature 543 on web page 500, can display a feature identifier 531 of "Touch" for the "touch" feature in the "unlocked phones" category. In certain embodiments, the display of feature 543 on web page 500 can display a status indicator 532, which can be a predetermined pattern or color. In a number of embodiments, the display of feature 543 on web page 500 can display a quantity indicator 533. Web page 500 can include feature type identifiers 535 for groups of features. As shown in FIG. 5, the features can be displayed in groupings by feature type, with each of feature type identifiers 535 used as a header.

In various embodiments, web page 500 can include an item listing 550. Item listing 550 can include one or more items, such as item 560. The display of each item, such as item 560, can include an item price 561, an item identifier 562, an item depiction 563, and/or a list of item features 564 corresponding to item 560.

By moving slider 520 to $60, the user can select a first price selection of $60. Items in the first subset of items having a price less than or equal to $60 can be displayed in item listing 560. Those features in the first category of the feature categorization of block 404 (FIG. 4), which have corresponding item features in the first subset of items, can be displayed with a status indicator having a first color/pattern, such as feature 541 and feature 543. Those features in the second category of the feature categorization determined in block 404 (FIG. 4), which do not have corresponding item features in the first subset of items, can be displayed with a status indicator having a second color/pattern, such as feature 542 and feature 544. The quantity indicator (e.g. 533) for each feature can display the number of items with a price less than or equal to the first price selection of $60 that have item features corresponding to the feature.

In other embodiments, a user can select one of feature type identifiers 535, and web page 500 can display one filtered feature listing and one filtered item listing for each of the features in the feature type group. The filtering can be based on each of the features in the feature type group. For example, if the user selected a feature type identifier of "Brand," web page 500 can display a first feature listing and a first item listing for a first brand feature, such as "LG," in which the items included in the first subset of items can be filtered to only include items with the LG feature. The feature listing can similarly be filtered to only include those features that correspond to item features in the filtered first subset of items. A filtered feature listing and filtered item listing and be displayed for each of the other Brand features. In some examples, the feature listings and/or item listings can be displayed side-by-side or tiled downward on web page 500.

Turning ahead in the drawings, FIG. 6 illustrates an example web page 600 for facilitating item selection based on a first and second price selection, in accordance with embodiments described herein. Web page 600 is merely exemplary, and embodiments for facilitating item selection can be employed in many different embodiments or examples not specifically depicted or described herein. In some embodiments, web server 320 (FIG. 3) can provide web page 600 to user computers (e.g., 340-344 (FIG. 3)). Web page 600 can be similar to web page 500 (FIG. 5), and various components of web page 600 can be identical to various components of web page 500 (FIG. 5). Web page 600 can display an update to web page 500 (FIG. 5) after a user selects a second price.

For example, after selecting $60 as a first price selection in web page 500 (FIG. 5), the user can move slider 520 to select a second price of $90 in web page 600. Price selection field 523 can be updated to reflect the second price selection of $90. Similarly, feature listing 530 and/or item listing 550 can provide an updated display of features and/or items. Item listing 550 can display items in the second subset of items, such as items 660, 670, and 680, for example, as determined in block 407 (FIG. 4). The items in the second subset of items can be items priced greater than the first price selection of $60, but less than or equal to the second first selection of $90.

In many embodiments, the features can be displayed in the same order, but the status indicator for each feature can be updated based on an updated feature categorization, for example, as determined in block 410 (FIG. 4). For example, feature 541 and feature 543, which remain in the first category of the updated feature categorization, can continue to be displayed with an updated status indicator having a first color/pattern. Feature 544, which was re-categorized in the updated feature categorization from the second category to the third category, based on feature 544 corresponding to item features in the second subset of items, can be displayed with an updated status indicator having a third color/pattern. Feature 542, which remains in the second category of the updated feature categorization, based on feature 542 not corresponding to any item features in the second category of items, can continue to be displayed with an updated status indicator having a second color/pattern. The quantity indicator (e.g. 533) for each feature can display the number of items with a price less than or equal to the second price selection of $90 and having item features corresponding to the feature.

In some embodiments, moving slider 520 to a yet higher price can set the second price selection to be the first price selection, and the new higher price can be the second price selection, and web page 600 can display the feature listing and/or item listing for the new first and second price selections. In other embodiments, moving slider 520 to a higher price can select a third price selection, in which web page 600 can display a new level of additional features available at the yet higher price.

Turning ahead in the drawings, FIG. 7 illustrates an example web page 600 for facilitating item selection based on features associated with a selected feature, in accordance with embodiments described herein. Web page 700 is merely exemplary, and embodiments for facilitating item selection can be employed in many different embodiments or examples not specifically depicted or described herein. In some embodiments, web server 320 (FIG. 3) can provide web page 700 to user computers (e.g., 340-344 (FIG. 3)). Web page 700 can be similar to web page 500 (FIG. 5) and/or web page 600 (FIG. 6), and various components of web page 700 can be identical to various components of web page 500 (FIG. 5) and/or web page 600 (FIG. 6). Web page 700 can display an update to web page 500 (FIG. 5) after a user selects a feature.

For example, if the user had selected $90 as a first price selection in web page 500 (FIG. 5), the user can click on a feature in the first category of the feature categorization, such as feature 543, to select the feature. Feature listing 530 and/or item listing 550 can provide an updated display of features and/or items. Item listing 550 can display items in the third subset of items, such as items 760 and 770, for example, as determined in block 409 (FIG. 4). The items in the third subset of items can be items priced less than or equal to the first price selection of $90 that have item features corresponding to the selected feature.

In many embodiments, the features can be displayed in the same order, but the updated status indicator for each feature can be updated based on an updated feature categorization, for example, as determined in block 410 (FIG. 4). For example, feature 541 can be categorized in the first category of the updated feature categorization, and can be displayed with an updated status indicator having a first color/pattern, indicating that feature 541 is available on items priced less than or equal to the first price selection of $90 that also have the selected feature. Feature 542 can be categorized in the second category of the updated feature categorization, and can be displayed with an updated status indicator having a second color/pattern, indicating that feature 542 is not available on any items prices less than or equal to the first price selection of $90. Feature 543 can be categorized in the third category of the updated feature categorization, and can be displayed with an updated status indicator having a third color/pattern, indicating that feature 543 is the selected feature. Feature 544 can be categorized in the fourth category of the updated feature categorization, and can be displayed with an updated status indicator having a fourth color/pattern, indicating that feature 544 is available on items priced less than or equal to the first price selection of $90 that do not have the selected feature. The quantity indicator (e.g. 533) for each feature can display the number of items with a price less than or equal to the first price selection of $90 that have item features corresponding to the feature.

In other embodiments, a user can select one of feature type identifiers 535, and web page 700 can display one feature listing and one item listing for each of the features in the feature type group, as if the user had selected each of the features individual. For example, if the user clicks on the "Form Factor" feature type, the feature listing and item listing displayed in web page 700, described above, can be shown for the "Touch" feature. Additionally, a feature listing and an item listing can be displayed on web page 700 for each of the other features in the "Form Factor" feature type, as if the user had individually selected each of those features. In some examples, the feature listings and/or item listings can be displayed side-by-side or tiled downward.

Figure 8:
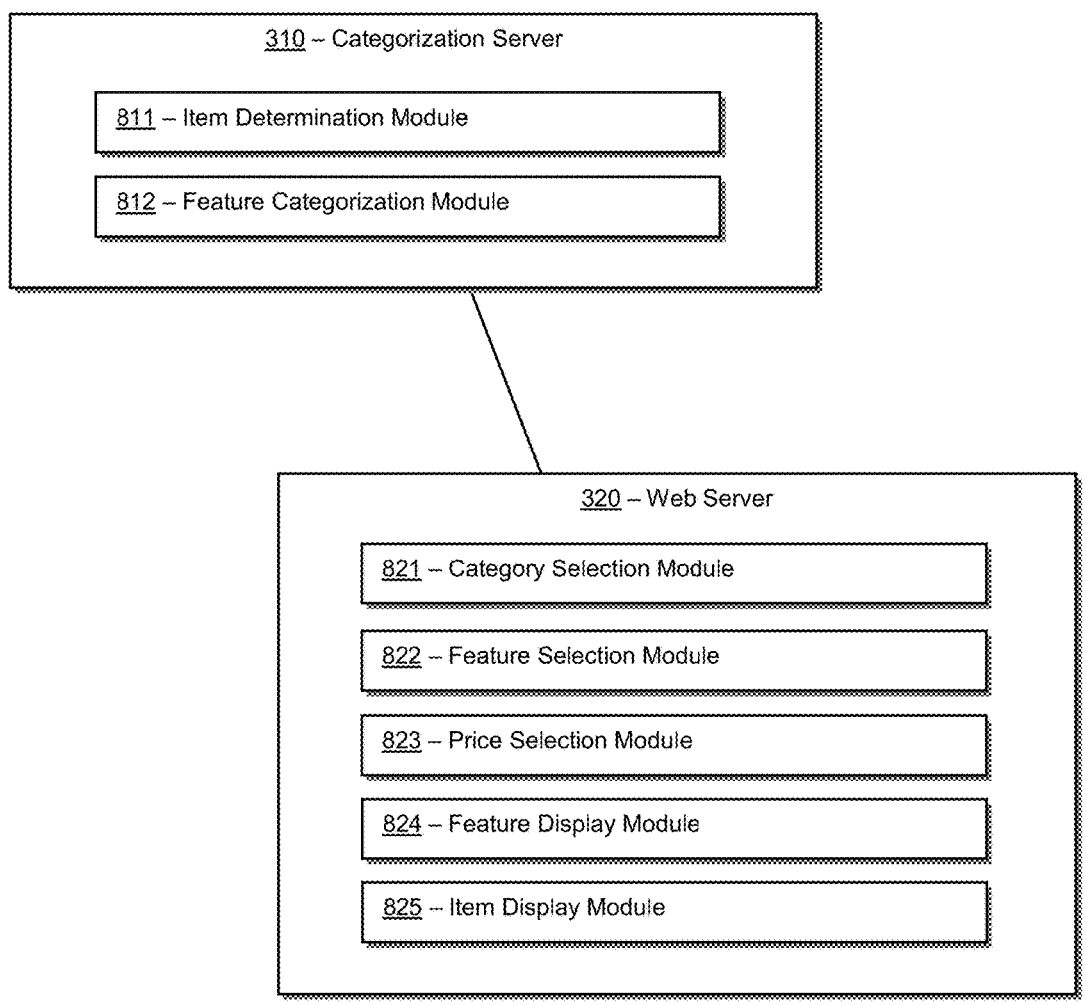
FIG. 8 illustrates a block diagram of an example of various components of the system, according to the embodiment of FIG. 3.

Turning ahead in the drawings, FIG. 8 illustrates a block diagram of system 300, according to the embodiment shown in FIG. 3. Categorization server 310 and web server 320 are merely exemplary and are not limited to the embodiments presented herein. Categorization server 310 and web server 320 can be employed in many different embodiments or examples not specifically depicted or described herein. In some embodiments, certain elements or modules of categorization server 310 and/or web server 320 can perform various procedures, processes, and/or acts. In other embodiments, the procedures, processes, and/or acts can be performed by other suitable elements or modules.

In a number of embodiments, categorization server 310 can include an item determination module 811. In certain embodiments, item determination module 811 can perform block 403 (FIG. 4) of determining the first subset of items, block 407 (FIG. 4) of determining the second subset of items, and/or block 409 (FIG. 4) of determining the third subset of items. In some embodiments, categorization server 310 can include a feature categorization module 812. In certain embodiments, feature categorization module 812 can perform block 404 (FIG. 4) of determining the feature categorization and/or block 410 (FIG. 4) of determining the updated feature categorization.

In some embodiments, web server 320 can include a category selection module 821. In certain embodiments, category selection module 821 can perform block 401 (FIG. 4) of receiving a category selection. In a number of embodiments, web server 320 can include a feature selection module 822. In certain embodiments, feature selection module 822 can perform block 408 (FIG. 4) of receiving a selected feature. In various embodiments, web server 320 can include a price selection module 823. In certain embodiments, price selection module 823 can perform block 402 (FIG. 4) of receiving a first price selection and/or block 406 (FIG. 4) of receiving a second price selection. In several embodiments, web server 320 can include a feature display module 824. In certain embodiments, feature display module 824 can perform block 405 (FIG. 4) of displaying feature identifiers and status indicators for each feature and/or block 411 (FIG. 4) of displaying feature identifiers and updated status indicators for each feature. In many embodiments, web server 320 can include an item display module 825. In certain embodiments, item display module 824 can perform displaying each item of the first, second, and/or third subsets of items.

Although facilitating item selection based on features has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 4 may be include different procedures, processes, and/or activities and be performed by many different modules, in many different orders. As another example, the modules within categorization server 310 and web server 320 in FIG. 8 can be interchanged or otherwise modified.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of facilitating item selection based on features, the features being an aggregate of item features corresponding to all items in a category of items, the method being implemented via execution of computer instructions configured to run at one or more processors and configured to be stored at one or more non-transitory computer-readable media, the method comprising:
   receiving a category selection for the category of items;

receiving a first price selection from a user adjusting a slider on a graphical user interface;

determining a first subset of items from the category of items having a price less than or equal to the first price selection;

determining, for each of the features, a feature categorization, wherein the feature is categorized in a first category if the feature corresponds to at least one of the item features of at least one item of the first subset of items, or otherwise is categorized in a second category;

displaying on the graphical user interface, for each of the features, a feature identifier and a status indicator, wherein the status indicator is based at least in part on the feature categorization, and the status indicator for each of the features comprises a quantity indicator based on a quantity of items from the first subset of items having the item features corresponding to the feature;

receiving a second price selection greater than the first price selection from the user further adjusting the slider on the graphical user interface;

determining a second subset of items from the category of items having a price greater than the first price selection and less than or equal to the second price selection;

determining, for each of the features, an updated feature categorization, wherein the feature categorization is modified such that the feature is categorized into a third category if the feature was categorized in the second category and if the feature corresponds to at least one of the item features of at least one item of the second subset of items, or otherwise remains in the same category; and displaying on the graphical user interface, for each of the features, the feature identifier and an updated status indicator, wherein the updated status indicator is based at least in part on the updated feature categorization, and the updated status indicator for each of the features comprises an updated quantity indicator based on a quantity of items from the first and second subset of items having the item features corresponding to the feature, as updated based on the second price selection.

2. The method of claim 1 further comprising displaying each item of the first subset of items.

3. The method of claim 2, wherein displaying each item of the first subset of items comprises:
displaying, for each item, at least one of an item identifier and an item depiction; and
displaying, for each item, a list of the item features corresponding to the item.

4. The method of claim 1, wherein the status indicator for each of the features comprises a color, wherein the color of the status indicator is: (a) a first color if the feature is categorized in the first category, or (b) a second color different from the first color if the feature is categorized in the second category.

5. The method of claim 1, wherein:
determining the first subset of items comprises predetermining, for each possible first price selection, the first subset of items having a price less than or equal to the possible first price selection; and
determining, for each of the features, the feature categorization comprises predetermining, for each of the features at each possible first price selection, the feature categorization, wherein the feature is categorized in the first category if the feature corresponds to at least one of the item features of at least one item of the first subset of items, or otherwise is categorized in the second category.

6. The method of claim 1, wherein displaying, for each of the features, the feature identifier and the status indicator comprises displaying each of the features by feature type.

7. The method of claim 1, wherein displaying, for each of the features, the feature identifier and the status indicator comprises displaying each of the features by an ordering of the features, wherein the ordering of the features is based on at least one of: (a) sales volumes of items having the item features corresponding to each feature, (b) a quantity of items having the item features corresponding to each feature, and (c) inherent rankings of the features.

8. The method of claim 7, wherein displaying, for each of the features, the feature identifier and the status indicator comprises displaying a first subset of features, wherein the first subset of features includes features having a highest order in the ordering of the features, and wherein a quantity of the first subset of features is less than a feature display limit.

9. The method of claim 1, wherein the features displayed are devoid of features that correspond to the item features included with every item in the category of items.

10. The method of claim 1 further comprising displaying each item of the second subset of items.

11. The method of claim 1, wherein the updated status indicator for each of the features comprises a color, wherein the color of the updated status indicator is: (a) a first color if the feature is categorized in the first category, (b) a second color different from the first color if the feature is categorized in the second category, or (c) a third color different from the first and second colors if the feature is categorized in the third category.

12. A system for facilitating item selection based on features, the features being an aggregate of item features corresponding to all items in a category of items, the system comprising:
one or more processors; and
one or more non-transitory computer-readable media storing computing instructions configured to run on the one or more processors and perform:
receiving a category selection for the category of items;
receiving a first price selection from a user adjusting a slider on a graphical user interface;
determining a first subset of items of the category of items having a price less than or equal to the first price selection;
determining, for each of the features, a feature categorization, wherein the feature is categorized in a first category if the feature corresponds to at least one of the item features of at least one item of the first subset of items, or otherwise is categorized in a second category;
displaying on the graphical user interface, for each of the features, a feature identifier and a status indicator, wherein the status indicator is based at least in part on the feature categorization, and the status indicator for each of the features comprises a quantity indicator based on a quantity of items from the first subset of items having the item features corresponding to the feature;
receiving a second price selection greater than the first price selection from the user further adjusting the slider on the graphical user interface;

determining a second subset of items having a price greater than the first price selection and less than or equal to the second price selection;

determining, for each of the features, an updated feature categorization, wherein the feature categorization is modified such that the feature is categorized into a third category if the feature was categorized in the second category and if the feature corresponds to an item feature of at least one item of the second subset of items, or otherwise remains in the same category; and displaying on the graphical user interface, for each of the features, the feature identifier and an updated status indicator, wherein the updated status indicator is based at least in part on the updated feature categorization, and the updated status indicator for each of the features comprises an updated quantity indicator based on a quantity of items from the first and second subset of items having the item features corresponding to the feature, as updated based on the second price selection.

13. The system of claim 12, wherein the computing instructions are further configured to perform displaying each item of the first subset of items.

14. The system of claim 13, wherein displaying each item of the first subset of items comprises:

displaying, for each item, at least one of an item identifier and an item depiction; and displaying, for each item, a list of the item features corresponding to the item.

15. The system of claim 12, wherein the status indicator for each of the features comprises a color, wherein the color of the status indicator is: (a) a first color if the feature is categorized in the first category, or (b) a second color different from the first color if the feature is categorized in the second category.

16. The system of claim 12, wherein:

determining the first subset of items comprises predetermining, for each possible first price selection, the first subset of items having a price less than or equal to the possible first price selection; and determining, for each of the features, the feature categorization comprises predetermining, for each of the features at each possible first price selection, the feature categorization, wherein the feature is categorized in the first category if the feature corresponds to at least one of the item features of at least one item of the first subset of items, or otherwise is categorized in the second category.

17. The system of claim 12, wherein displaying, for each of the features, the feature identifier and the status indicator comprises displaying each of the features by an ordering of the features, wherein the ordering of the features is based on at least one of: (a) sales volumes of items having the item features corresponding to each feature, (b) a quantity of items having the item features corresponding to each feature, and (c) inherent rankings of the features.

18. The system of claim 17, wherein displaying, for each of the features, the feature identifier and the status indicator comprises displaying a first subset of features, wherein the first subset of features includes features having a highest order in the ordering of the features, and wherein a quantity of the first subset of features is less than a feature display limit.

19. The system of claim 12, wherein the computing instructions are further configured to perform displaying each item of the second subset of items.

20. The system of claim 12, wherein the updated status indicator for each of the features comprises a color, wherein the color of the updated status indicator is: (a) a first color if the feature is categorized in the first category, (b) a second color different from the first color if the feature is categorized in the second category, or (c) a third color different from the first and second colors if the feature is categorized in the third category.

* * * * *